(12) United States Patent
Annam et al.

(10) Patent No.: US 11,574,380 B2
(45) Date of Patent: Feb. 7, 2023

(54) METHODS AND APPARATUS FOR OPTIMIZING GPU KERNEL WITH SIMO APPROACH FOR DOWNSCALING UTILIZING GPU CACHE

(71) Applicant: QUALCOMM Incorporated, San Diego, CA (US)

(72) Inventors: Raja Shekhar Reddy Annam, Hyderabad (IN); Hanisha Chowdary Nandigam, Rajahmundry (IN); Hariharan Raju, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/069,734

(22) Filed: Oct. 13, 2020

(65) Prior Publication Data

US 2022/0114694 A1  Apr. 14, 2022

(51) Int. Cl.
*G06T 1/20* (2006.01)
*G06T 1/60* (2006.01)
*G06T 3/40* (2006.01)

(52) U.S. Cl.
CPC .......... *G06T 1/20* (2013.01); *G06T 1/60* (2013.01); *G06T 3/40* (2013.01)

(58) Field of Classification Search
CPC ............. G06T 1/20; G06T 1/60; G06T 3/40
See application file for complete search history.

(56) References Cited

U.S. PATENT DOCUMENTS

| 2016/0307297 | A1* | 10/2016 | Akenine-Moller | G06T 11/40 |
| 2017/0316601 | A1* | 11/2017 | Kakarlapudi | G06T 17/10 |
| 2018/0007303 | A1* | 1/2018 | Meixner | G06F 17/16 |
| 2018/0084269 | A1* | 3/2018 | Qiu | H04N 19/423 |
| 2021/0110512 | A1* | 4/2021 | Hussain | G06T 5/003 |

OTHER PUBLICATIONS

Anonymous: "Configuration" In: "IEEE Standard Glossary of Computer Hardware Terminology", Jun. 14, 1994 (Jun. 14, 1994), IEEE, XP055869570, vol. 610, pp. 19-20.
International Search Report and Written Opinion—PCT/US2021/050127—ISA/EPO—dated Jan. 5, 2022.

(Continued)

*Primary Examiner* — Samantha (Yuehan) Wang
(74) *Attorney, Agent, or Firm* — Procopio, Cory, Hargreaves & Savitch

(57) ABSTRACT

The present disclosure relates to methods and devices for graphics processing including an apparatus. In some aspects, the apparatus may determine a first input pixel area of an input image and a second input pixel area of the input image. The apparatus may also convert at least one of one or more first input pixels of a plurality of first input pixels or one or more second input pixels of a plurality of second input pixels. Additionally, the apparatus may store, in at least one cache or memory, the converted at least one of the one or more first input pixels or the one or more second input pixels. The apparatus may also configure at least one of one or more first output pixels of a plurality of first output pixels or one or more second output pixels of a plurality of second output pixels.

37 Claims, 8 Drawing Sheets

(56) References Cited

OTHER PUBLICATIONS

Lam, M.S., et al., "The Cache Performance and Optimizations of Blocked Algorithms", ACM Sigplan Notices, Association for Computing Machinery, US, vol. 26, No. 4, Apr. 1, 1991 (Apr. 1, 1991), XP058196454, pp. 63-74, Abstract p. 65 , Left-Hand Column, Paragraph 3-Paragraph 4.
Membarth, R., et al., "Generating Device-Specific GPU Code for Local Operators in Medical Imaging", 2012 IEEE 26th International Parallel and Distributed Processing Symposium, May 1, 2012 (May 1, 2012), XP055869566, pp. 569-581, p. 573, Right-Hand Column, Last Paragraph p. 574, Left-Hand Column, Paragraph 2.
Ryoo, S., et al., "Optimization Principles and Application Performance Evaluation of a Multithreaded GPU Using CUDA", In Proceedings of the 13th ACM SIGPLAN Symposium on Principles and Practice of Parallel Programming, (PPoPP '08), Feb. 20-23, 2008, ACM, Salt Lake City, UT, 2008, New York, USA, XP055869567, pp. 73-82, DOI: 10.1145/1345206.1345220, URL: https://dl.acm.org/citation.cfm?id=1345220 [retrieved on Nov. 11, 2019], p. 77, Left-hand Column, Last Paragraph—Right-Hand Column, Paragraph 3.

\* cited by examiner

METHODS AND APPARATUS FOR OPTIMIZING GPU KERNEL WITH SIMO APPROACH FOR DOWNSCALING UTILIZING GPU CACHE

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus may configure information associated with an input image based on at least one kernel, where the input image is associated with each of a plurality of threads. The apparatus may also determine a first input pixel area of an input image and a second input pixel area of the input image, the first input pixel area including a plurality of first input pixels and the second input pixel area including a plurality of second input pixels, the first input pixel area and the second input pixel area associated with at least one kernel. The apparatus may also convert at least one of one or more first input pixels of the plurality of first input pixels or one or more second input pixels of the plurality of second input pixels, at least one of the plurality of first input pixels or the plurality of second input pixels corresponding to a first thread of a plurality of threads associated with the at least one kernel. Additionally, the apparatus may store, in at least one cache or memory, the converted at least one of the one or more first input pixels or the one or more second input pixels. The apparatus may also obtain, based on the stored at least one of the one or more first input pixels or the one or more second input pixels, at least one of the plurality of second input pixels or at least one the plurality of first input pixels. The apparatus may also configure, based on the stored at least one of the one or more first input pixels or the one or more second input pixels, at least one of one or more first output pixels of a plurality of first output pixels or one or more second output pixels of a plurality of second output pixels, the plurality of first output pixels and the plurality of second output pixels corresponding to the plurality of threads associated with the at least one kernel. Moreover, the apparatus may configure at least one of a first output image based on the plurality of first output pixels or a second output image based on the plurality of second output pixels, where the first output image and the second output image are associated with the plurality of threads. The apparatus may also display at least one of the first output image or the second output image.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
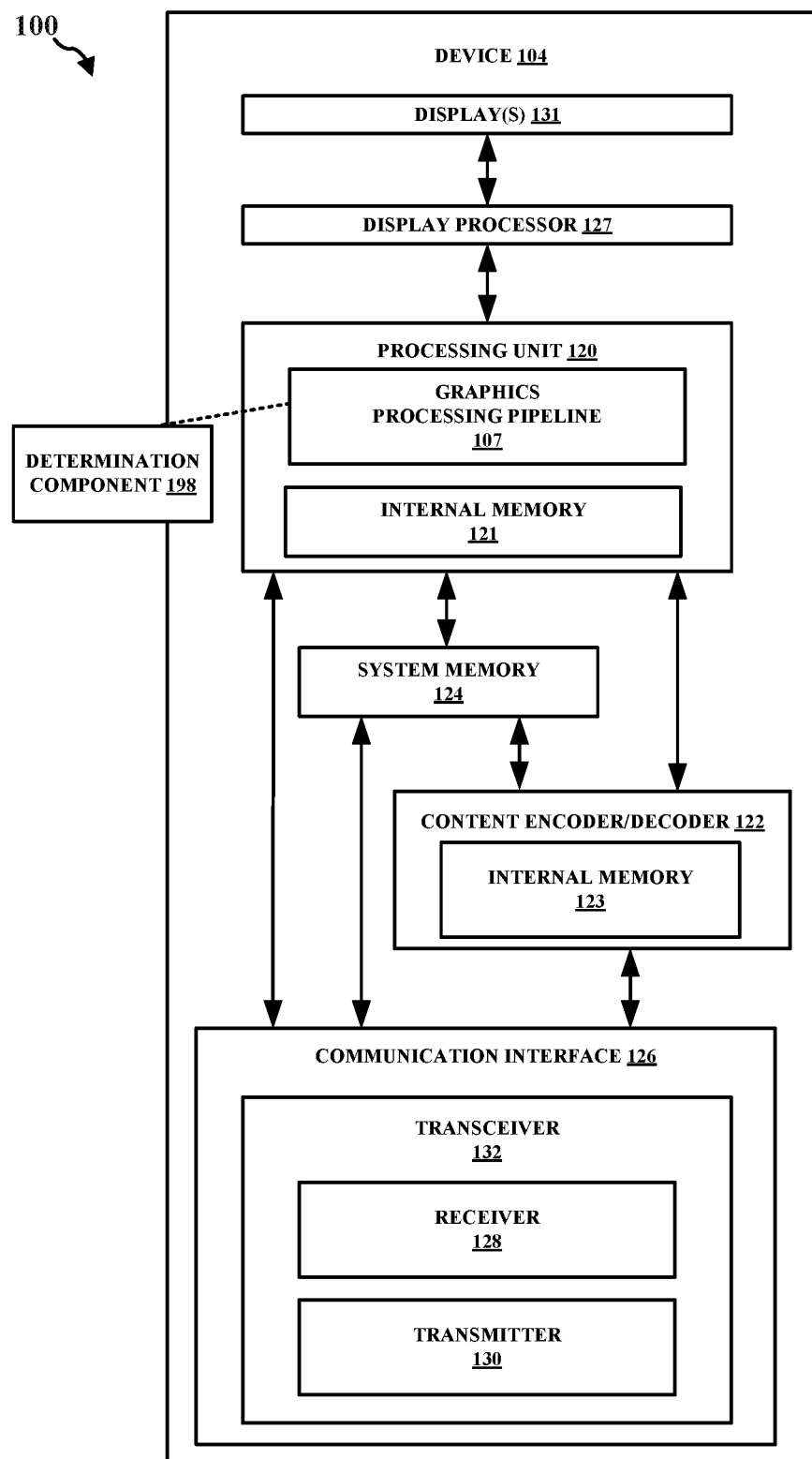
FIG. 1 is a block diagram that illustrates an example content generation system in accordance with one or more techniques of this disclosure.

In some instances, GPUs may take a single input and use a kernel to perform downscaling. For example, if a single instance of a GPU is used to perform a downscaling operation, it may execute a downscaling kernel multiple times, i.e., execute the kernel for each downscaling instance. Further, for each downscaling operation, an input may be read once per operation. For example, if a GPU performs three (3) different downscaling operations, the input may be read three (3) times. This may lead to an increased double data rate (DDR) bandwidth (BW) consumption and/or an increased CPU utilization. In turn, this may be a bottleneck for certain types of chipsets, e.g., low tier chipsets. Additionally, each kernel may be carried from the CPU to a GPU kernel for execution. So for each downscaling operation, data may be transferred from the CPU to a GPU kernel, and from the GPU kernel to GPU hardware. Accordingly, if three (3) downscaling operations are performed, three (3) times the data may be passed from the CPU to the GPU. As such, if a kernel is called or executed every time for each downscale, this may result in an increased overhead. Aspects of the present disclosure can reduce the amount of times that an input image is read in a downscaling operation. Aspects of the present disclosure can also reduce the amount of times that a kernel or averaging operation is called. Additionally, aspects of the present disclosure can call a kernel a single time for each downscaling operation. Further, aspects of the present disclosure may include a single input and multiple outputs for downscaling with a single kernel call.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to configure information associated with an input image based on at least one kernel, where the input image is associated with each of a plurality of threads. The determination component 198 can also be configured to determine a first input pixel area of an input image and a second input pixel area of the input image, the first input pixel area including a plurality of first input pixels and the second input pixel area including a plurality of second input pixels, the first input pixel area and the second input pixel area associated with at least one kernel. The determination component 198 can also be configured to convert at least one of one or more first input pixels of the plurality of first input pixels or one or more second input pixels of the plurality of second input pixels, at least one of the plurality of first input pixels or the plurality of second input pixels corresponding to a first thread of a plurality of threads associated with the at least one kernel. The determination component 198 can also be configured to store, in at least one cache or memory, the converted at least one of the one or more first input pixels or the one or more second input pixels. The determination component 198 can also be configured to obtain, based on the stored at least one of the one or more first input pixels or the one or more second input pixels, at least one of the plurality of second input pixels or at least one the plurality of first input pixels. The determination component 198 can also be configured to configure, based on the stored at least one of the one or more first input pixels or the one or more second input pixels, at least one of one or more first output pixels of a plurality of first output pixels or one or more second output pixels of a plurality of second output pixels, the plurality of first output pixels and the plurality of second output pixels corresponding to the plurality of threads associated with the at least one kernel. The determination component 198 can also be configured to configure at least one of a first output image based on the plurality of first output pixels or a second output image based on the plurality of second output pixels, where the first output image and the second output image are associated with the plurality of threads. The determination component 198 can also be configured to display at least one of the first output image or the second output image.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
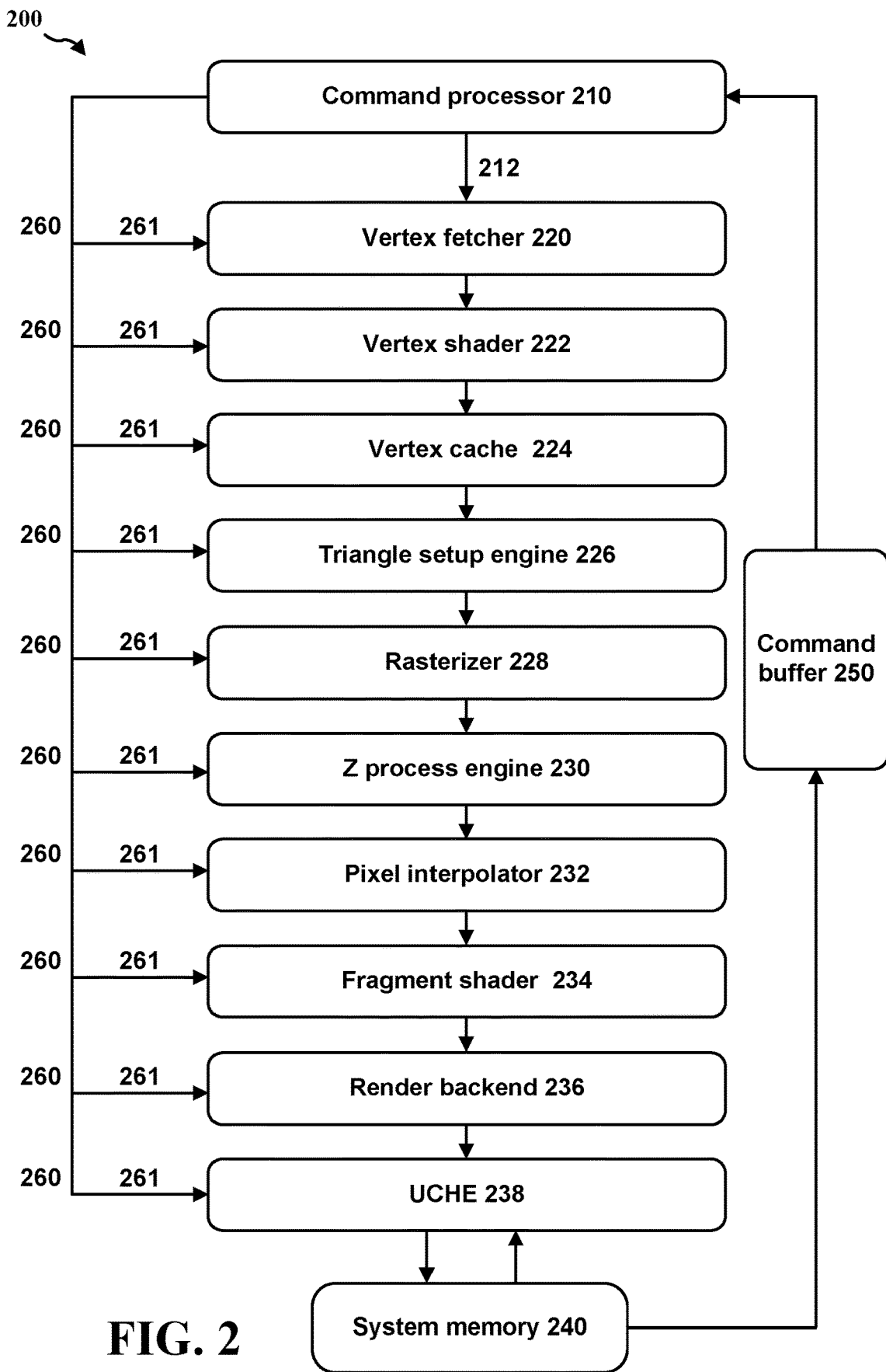
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information for each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

In aspects of graphics processing, some components, e.g., cameras, may include multiple use cases where a graphics processing unit (GPU) can be utilized for its downscaling capability using a program or a computing language, e.g., an open computing language (OpenCL). GPUs can be used for different types of downscaling factors, such as downscaling by a factor of 4 (DS4) or downscaling by a factor of 16 (DS16). GPUs can also be used for downscaling by any amount, e.g., downscaling by a factor of M/N (DS M/N). These different downscaling operations may correspond to different operations, e.g., different camera operations, such as a preview mode or a video mode.

In some instances, GPUs may take a single input and use an OpenCL based kernel to perform downscaling. As indicated herein, a kernel may be a programming operations manager or a programming thread. For example, if a single instance of a GPU is used to perform a downscaling operation, e.g., downscaling at DS4 or DS16, it may execute a downscaling OpenCL kernel multiple times, i.e., execute the kernel for each downscaling instance. Further, for each downscaling operation, an input may be read once per operation. For example, if a GPU performs three (3) different downscaling operations, the input may be read three (3) times. This may lead to an increased double data rate (DDR) bandwidth (BW) consumption and/or an increased CPU utilisation. In turn, this may be a bottleneck for certain types of chipsets, e.g., low tier chipsets.

Additionally, each kernel, e.g., OpenCL kernel, may be carried from the CPU to a GPU kernel for execution. So for each downscaling operation, data may be transferred from the CPU to a GPU kernel, and from the GPU kernel to GPU hardware. Accordingly, if three (3) downscaling operations are performed, three (3) times the data may be passed from the CPU to the GPU. As such, if an OpenCL kernel is called or executed every time for each downscale, this may result in an increased overhead.

In some aspects, utilizing an existing kernel, e.g., an OpenCL kernel, for GPU downscaling may assume a destination output image, e.g., a downscaled image 'a' (DSa) or a downscaled image 'b' (DSb). This downscaled image DSa or DSb may correspond to a certain downscale factor, e.g., a first downscale factor (S1) or a second downscale factor (S2). Also, a work group size may be the number of GPU threads per-frame that are invoked by the downscaling operation. A work group size may include an area with a width and a height of the output image, e.g., dimensions of W×H. For each output thread, the thread may call a kernel and read an input image corresponding to a downscale factor, and then write to the output image. So the kernel may be called and the input image may be read for each downscaling operation.

Figure 3:
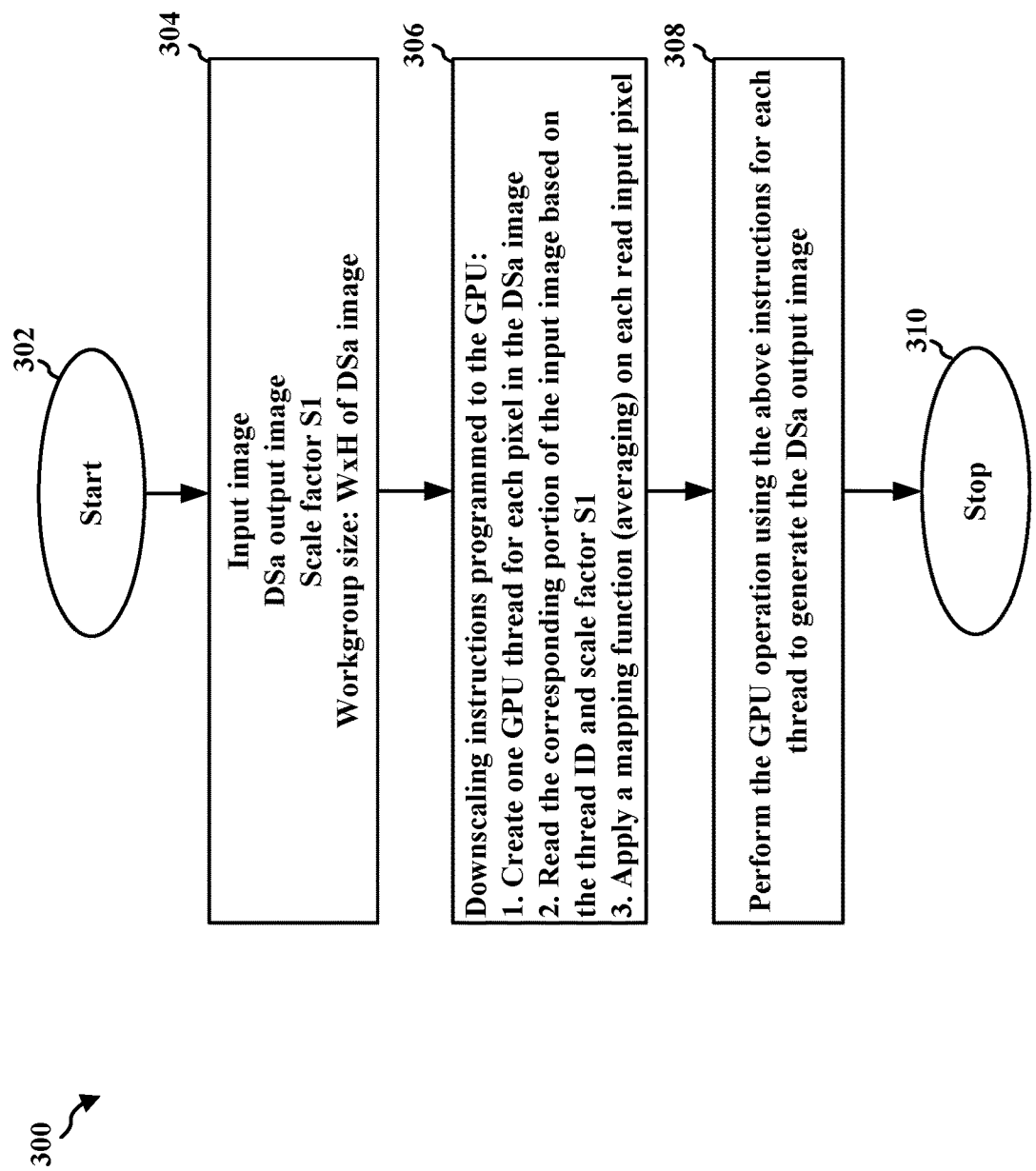
FIG. 3 illustrates an example flowchart of an example method for a downscaling operation in accordance with one or more techniques of this disclosure.

FIG. 3 illustrates flowchart 300 of an example method for a downscaling operation. As shown in diagram 300 of FIG. 3, at 302, the downscaling operation may start. At 304, the downscaling operation may include an input image, a DSa output image, a first scale factor (S1), and a workgroup size of W×H for DSa output image. At 306, the downscaling instructions programmed to the GPU may be: (1) create one GPU thread for each pixel in the DSa image, (2) read the corresponding portion of the input image based on the thread identifier (ID) and first scale factor S1, and (3) apply a mapping function (i.e., an averaging) on each read input pixel. At 308, the downscaling operation may perform the GPU operation using the above instructions for each thread to generate the DSa output image. At 310, the downscaling operation may stop.

Figure 4:
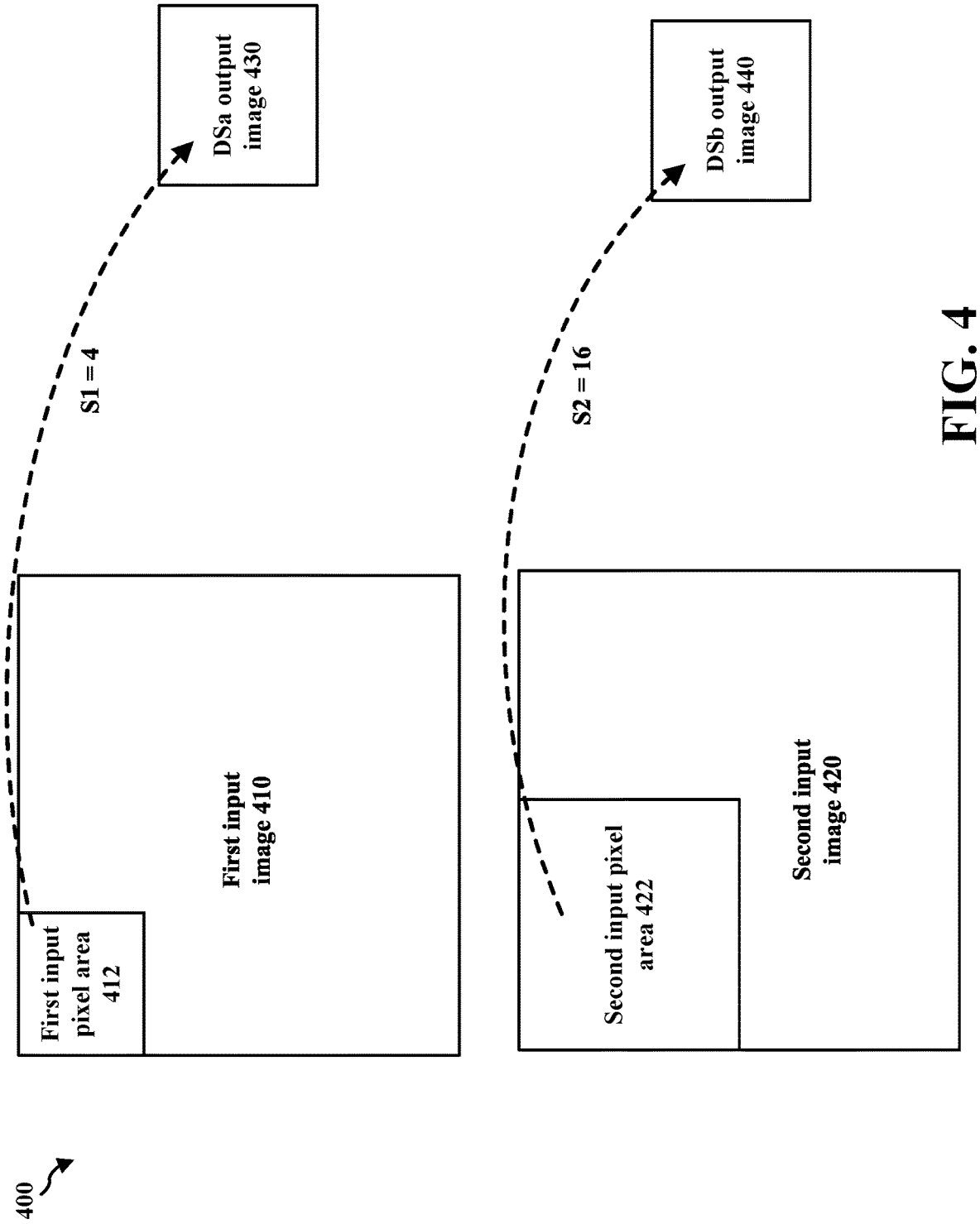
FIG. 4 illustrates an example diagram of a downscaling operation in accordance with one or more techniques of this disclosure.

FIG. 4 illustrates diagram 400 of a downscaling operation. As shown in FIG. 4, diagram 400 includes first input image 410, first input pixel area 412, second input image 420, second input pixel area 422, DSa output image 430, and DSb output image 440. The first input pixel area 412 may include multiple pixels, e.g., a 4×4 block of pixels. Also, the second input pixel area 422 may include multiple pixels, e.g., a 16×16 block of pixels. The pixels in first input pixel area 412 may be downscaled to at least one pixel in DSa output image 430. Further, the pixels in second input pixel area 422 may be downscaled to at least one pixel in DSb output image 440.

FIG. 4 displays that some aspects of graphics processing may perform downscaling operations by reading one or more input images multiple times. In the output image, e.g., DSa output image 430 or DSb output image 440, each pixel may correspond to a thread, i.e., a unit of execution. Also, the kernel may include an averaging operation for a certain size of pixels, e.g., a 4×4 block or pixels for first input pixel area 412 or a 16×16 block or pixels for second input pixel area 422.

As shown in FIG. 4, the first input pixel area 412 of the first input image 410 may be downscaled by a certain factor S1, e.g., a factor of four (4). During the downscaling operation, when the kernel is called, it may determine the average for each input pixel in the first input pixel area 412, e.g., a 4×4 block of pixels, to at least one output pixel of DSa output image 430. So an output pixel may correspond to an average of the pixels in the first input pixel area 412, e.g., a 4×4 block of pixels. As indicated above, there may be a data transfer from the CPU to the GPU for each downscaling operation.

As further shown in FIG. 4, the second input pixel area 422 of the second input image 420 may be downscaled by a certain factor S2, e.g., a factor of 16. During the downscaling operation, when the kernel is called, it may determine the average for each input pixel in the second input pixel area 422, e.g., a 16×16 block of pixels, to at least one output pixel of DSb output image 440. So an output pixel may correspond to an average of the pixels in the second input pixel area 422, e.g., a 16×16 block of pixels.

Based on the above, it may be beneficial to reduce the amount of times that an input image is read in downscaling operations. It may also be beneficial to reduce the amount of times that a kernel is called for each downscaling operation. For instance, it may be beneficial to call a kernel a single time for all downscaling operations.

Aspects of the present disclosure can reduce the amount of times that an input image is read in a downscaling operation. Aspects of the present disclosure can also reduce the amount of times that a kernel or averaging operation is called. Additionally, aspects of the present disclosure can call a kernel a single time for all downscaling operations. Further, aspects of the present disclosure may include a single input and multiple outputs approach for downscaling with a single kernel call.

Figure 5:
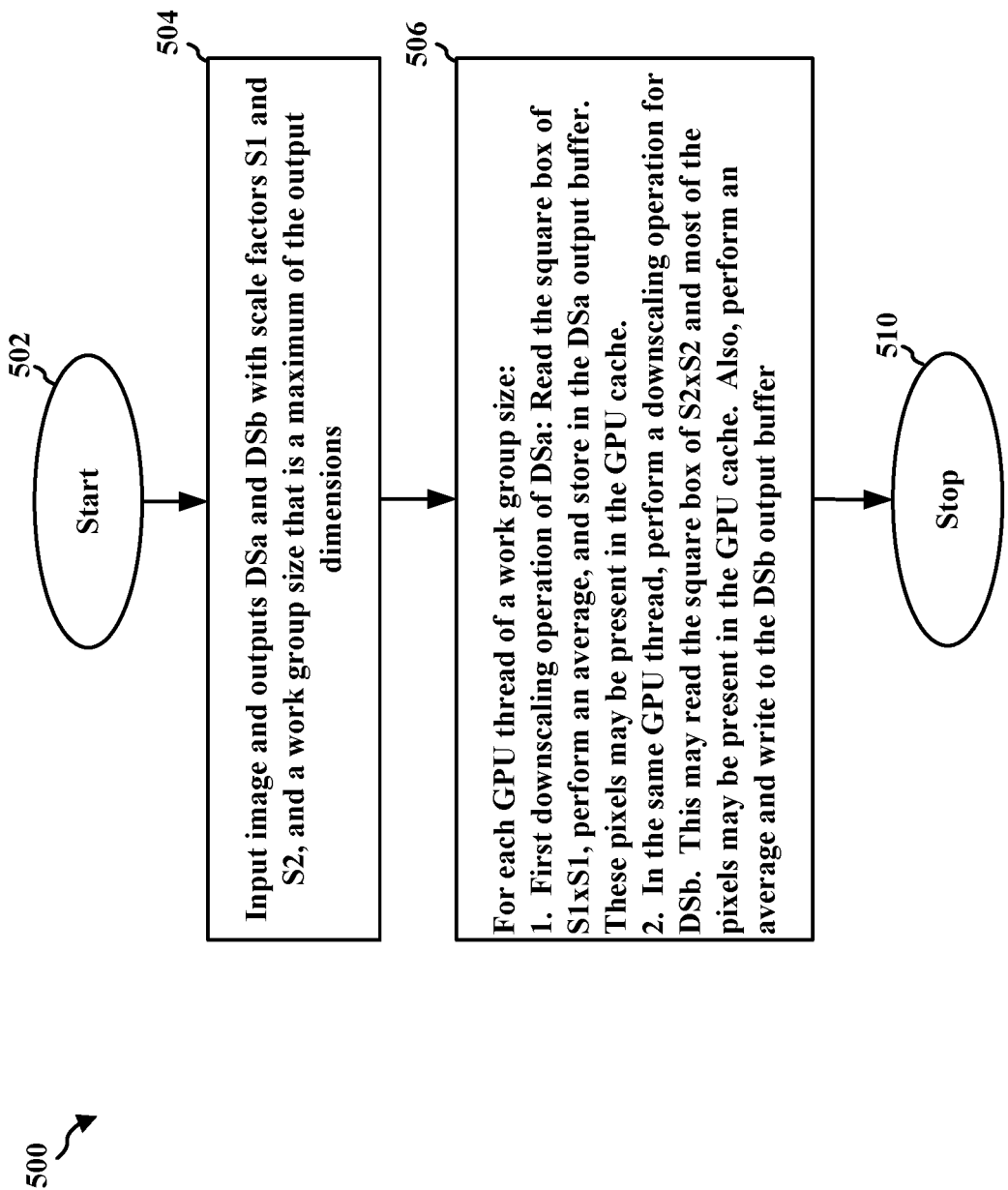
FIG. 5 illustrates an example flowchart of an example method for a downscaling operation in accordance with one or more techniques of this disclosure.

FIG. 5 illustrates flowchart 500 of an example method for a downscaling operation. As shown in diagram 500 of FIG. 5, at 502, the downscaling operation may start. At 504, the downscaling operation may include an input image, a DSa output image with a first scale factor (S1), a DSb output image with a second scale factor (S2), and a workgroup size of W×H, which can correspond to a maximum number of the output dimensions. At 506, for each GPU thread of a work group size, the first downscaling operation of DSa may read the square box of S1×S1, perform an averaging operation, and store this in the DSa output buffer. These pixels may be present in the GPU cache. Additionally, in the same GPU thread, a second downscaling operation for DSb may read the square box of S2×S2 and most of the pixels may be present in the GPU cache. Also, the second downscaling operation for DSb may perform an averaging operation and write to the DSb output buffer. These multiple downscaling operations may be called with a single kernel. At 510, the downscaling operation may stop.

Figure 6:
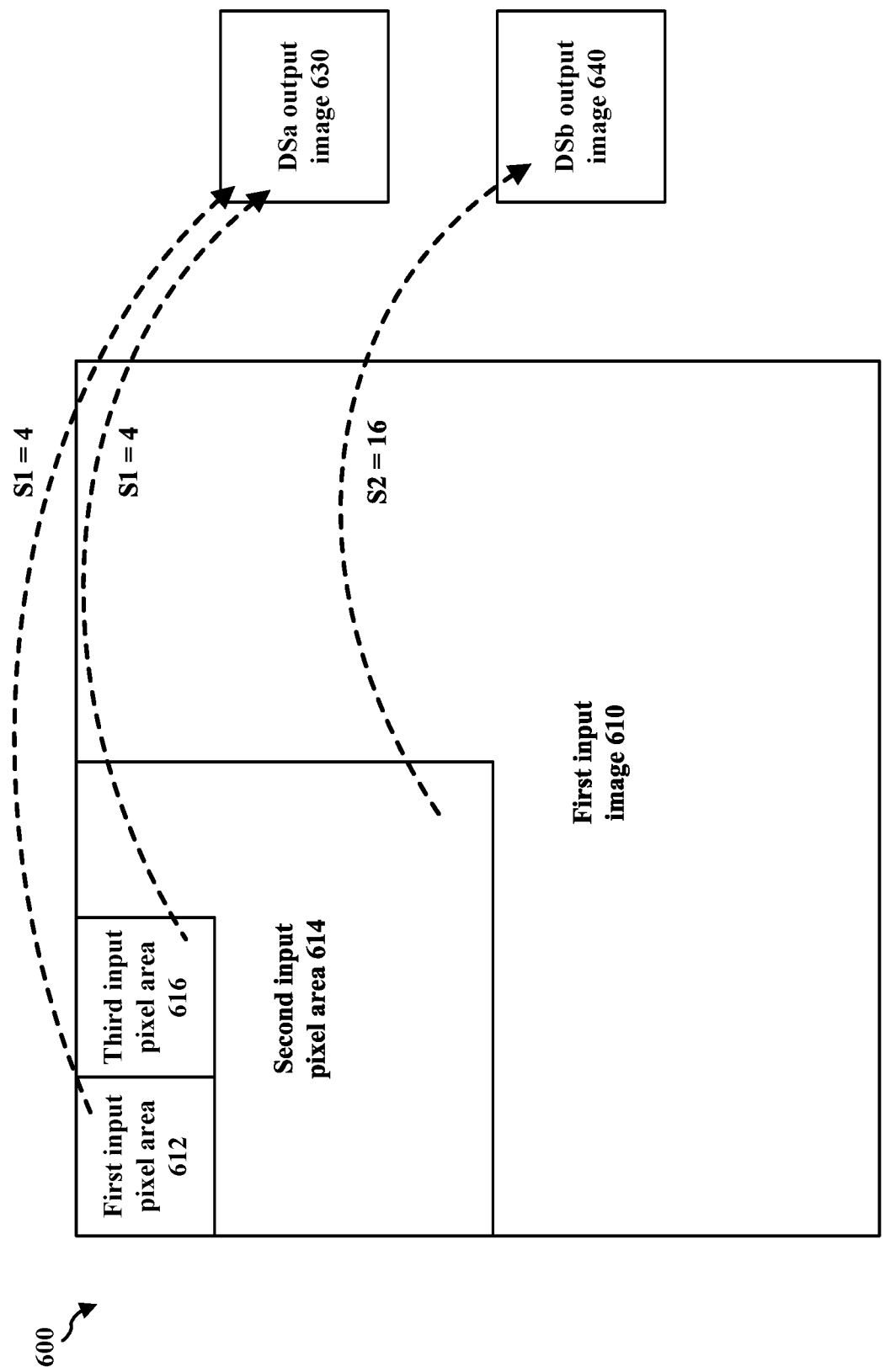
FIG. 6 illustrates an example diagram of a downscaling operation in accordance with one or more techniques of this disclosure.

FIG. 6 illustrates diagram 600 of a downscaling operation. As shown in FIG. 6, diagram 600 includes first input image 610, first input pixel area 612, second input pixel area 614, third input pixel area 616, DSa output image 630, and DSb output image 640. The first input pixel area 612 may include multiple pixels, e.g., a 4×4 block of pixels. Further, the third input pixel area 616 may include multiple pixels, e.g., a 4×4 block of pixels. The second input pixel area 614 may also include multiple pixels, e.g., a 16×16 block of pixels. The pixels in first input pixel area 612 may be downscaled to at least one pixel in DSa output image 630. The pixels in third input pixel area 616 may also be downscaled to at least one pixel in DSa output image 630. Moreover, the pixels in second input pixel area 614 may be downscaled to at least one pixel in DSb output image 640.

FIG. 6 displays that some aspects of the present disclosure may perform downscaling operations by reading an input image a single time. For instance, as shown in FIG. 6, aspects of the present disclosure may perform downscaling for a single input and multiple outputs with a single kernel call. As shown in FIG. 6, first downscale factor (S1) for first input pixel area 612 and third input pixel area 616 can be equal to four (4). The second downscale factor (S2) for second input pixel area 614 can be equal to 16. Also, in the output image, e.g., DSa output image 630 or DSb output image 640, each pixel may correspond to a thread, i.e., a unit of execution. The kernel may include an averaging operation for a certain size of pixels, e.g., a 4×4 block or pixels for first input pixel area 612, a 4×4 block of pixels for third input pixel area 616, or a 16×16 block or pixels for second input pixel area 614.

As shown in FIG. 6, the first input pixel area 612 of the first input image 610 may be downscaled by a certain factor S1, e.g., a factor of four (4). Third input pixel area 616 may also be downscaled by S1, e.g., a factor of four (4). During the downscaling operation, when the kernel is called, it may determine the average for each input pixel in the first input pixel area 612 or the third input pixel area 616, e.g., a 4×4 block of pixels, and then downscale by a certain factor, e.g., a factor of four (4), to at least one output pixel of DSa output image 630. So an output pixel may correspond to an average of the pixels in the first input pixel area 612 or the third input pixel area 616, e.g., a 4×4 block of pixels. As further shown in FIG. 6, the second input pixel area 614 of the first input image 610 may be downscaled by a certain factor S2, e.g., a factor of 16. During the downscaling operation, when the kernel is called, it may determine the average for each input pixel in the second input pixel area 614, e.g., a 16×16 block of pixels, and then downscale by a certain factor, e.g., a factor of 16, to at least one output pixel of DSb output image 640. So an output pixel may correspond to an average of the pixels in the second input pixel area 614, e.g., a 16×16 block of pixels. As indicated above, there may be a data transfer from the CPU to the GPU for each downscaling operation.

As shown in FIG. 6, in aspects of the present disclosure, an input image may be read with a single kernel. For instance, the first input pixel area 612, e.g., a 4×4 block of pixels, of the input image 610 may be read, and then a first pixel may be written for the DSa output image 630. Further, the third input pixel area 616, e.g., a 4×4 block of pixels, may be read, and then a second pixel may be written for the DSa output image 630. So the kernel may read the first input pixel area 612 including a plurality of first pixels corresponding to a first pixel of DSa 630, and ensure that the plurality of first pixels are stored in the cache. This may likewise occur for the third input pixel area 616. Also, the second input pixel area 614, e.g., a 16×16 block of pixels, of the input image 610 may be read, and then a first pixel may be written for the DSb output image 640. That is, the kernel may read the 16×16 block corresponding to a first pixel of DSb 640, and ensure that the 16×16 block is stored in the cache. Moreover, as the first input pixel area 612 and the third input pixel area 616 are 4×4, and the second input pixel area 614 is 16×16, the second input pixel area 614 may be 16 times larger than the first input pixel area 612 or the third input pixel area 616. As such, there may be 16 output pixels in DSa 630 for each output pixel in DSb 640.

In some instances, the input pixel areas 612/616 for the DSa output image 630 can be read at the same time as the second input pixel area 614 for the DSb output image 640. Accordingly, as the 4×4 block of first input pixel area 612 is being read for the first pixel of the DSa output 630, the 16×16 block of second input pixel area 614 may be read for the first pixel of the DSb output 640. So a single kernel may call multiple downscaling operations at the same time. That is, the present disclosure may generate multiple pixels for multiple output images in a single thread and at a single instance. Moreover, the data from the 4×4 block of input pixel areas 612/616 may be present in the cache while the data from the 16×16 block of second input pixel area 614 is being read. Thus, the kernel may determine that the data from the first input pixel area 612 is present in the cache while reading the second input pixel area 614, which may increase the amount of cache hits. Also, if data from the first input pixel area 612 is present in the cache, the corresponding data for the second input pixel area 614 may be averaged. As such, aspects of the present disclosure can improve the cache hit for the next thread of DSa output 630 or DSb output 640, as most of the pixels to be read by the GPU may already be present in the cache due to the execution of the DSa thread or the DSb thread.

As indicated above, after reading the 4×4 block of input pixel areas 612/616 and/or the 16×16 block of second input pixel area 614, the corresponding data may be stored in the cache. Hence, when a pixel of the DSa output image 630 is being computed, the corresponding data from the 16×16 block of second input pixel area 614 may already be stored in the cache. So the kernel may determine that the data from the second input pixel area 614 or 16×16 block is present in the cache while reading a second pixel for DSa 630, which may increase the amount of cache hits.

As shown in FIG. 6, there may be a third input pixel area 616 that is adjacent to the first input pixel area 612. The third input pixel area 616 may be used to fill a second pixel in DSa output image 630. So the first input pixel area 612 may correspond to a first pixel in DSa output image 630, and the third input pixel area 616 may correspond to a second pixel in DSa output image 630. The second input pixel area 614 may correspond to a first pixel in DSb output image 640. The DSa output image 630 and the DSb output image 640 may be associated with a plurality of output images, where the plurality of output images may include any number of output images, e.g., two, four, eight, sixteen, etc.

Additionally, a first thread of a plurality of threads may be associated with at least one pixel of the first output pixels, e.g., in DSa output image 630, and at least one pixel of the second output pixels, e.g., DSb output image 640. In some aspects, the first thread of a plurality of threads may be associated with multiple pixels of the first output pixels and one pixel of the second output pixels. Also, the at least one pixel of the first output pixels associated with the first thread may correspond to the first input pixel area 612 and the third input pixel area 616. Further, the at least one pixel of the second output pixels may correspond to the second input pixel area 614.

Figure 7:
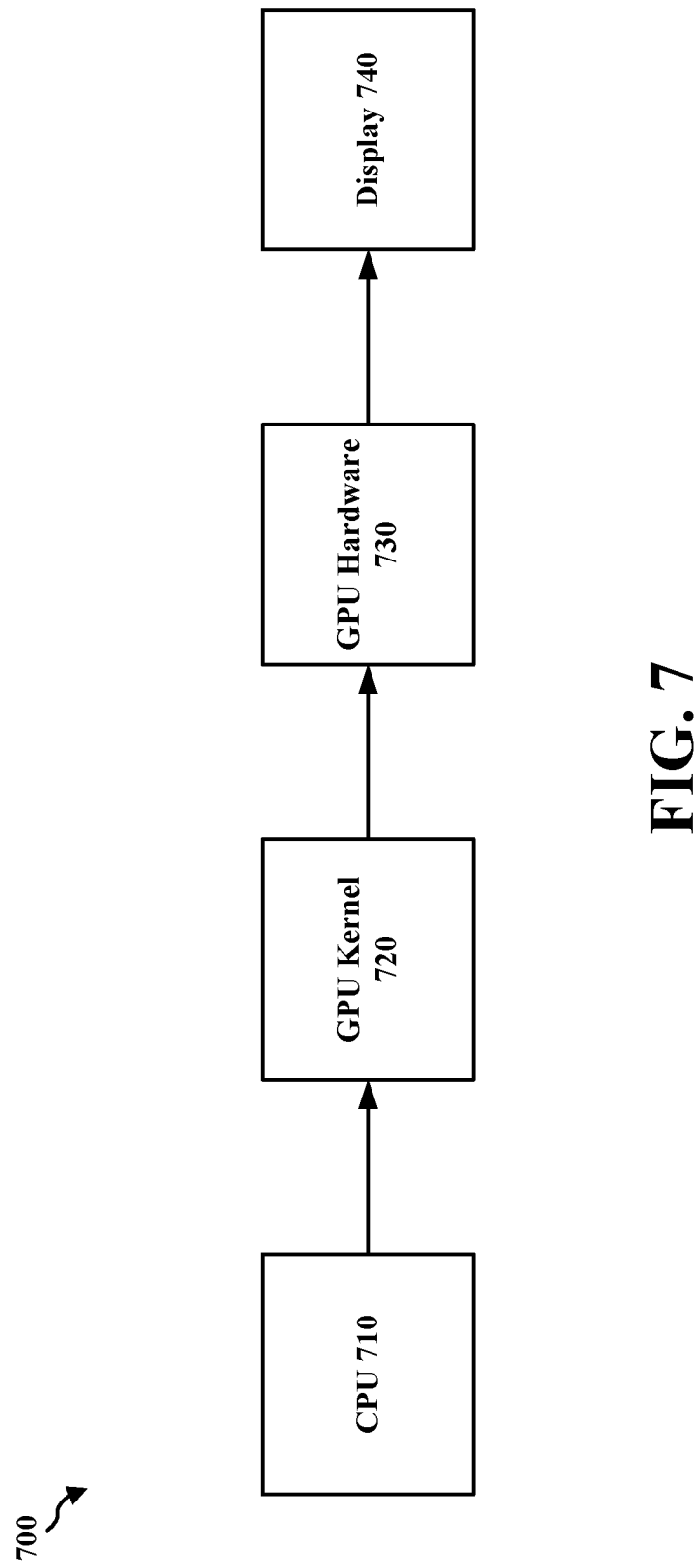
FIG. 7 illustrates an example diagram including CPU and GPU components in accordance with one or more techniques of this disclosure.

FIG. 7 illustrates diagram 700 including CPU 710, GPU kernel 720, GPU hardware 730, and display 740. As shown in FIG. 7, diagram 700 depicts a flow diagram for downscaling operations. As shown in FIG. 7, a kernel execution for a downscaling operation, e.g., an OpenCL kernel execution, may occur from the CPU 710 to the GPU kernel 720, then from the GPU kernel 720 to the GPU hardware 730, and finally the GPU hardware 730 may complete the execution of the downscaling operation. The downscaled images may then be sent to the display 740.

In some aspects of the present disclosure, when a kernel, e.g., an OpenCL kernel, is called twice for each downscaling operation, each of the above steps in FIG. 7 may occur twice. In some chipsets, e.g., low tier chipsets, the overhead may be increased from the CPU 710 to the GPU kernel 720 and from GPU kernel 720 to GPU hardware 730. In aspects of the present disclosure, e.g., in a single OpenCL kernel, two downscaling operations may be performed, so the overhead from CPU 710 to GPU kernel 720 and from GPU kernel 720 to GPU hardware 730 may be reduced, e.g., reduced by half.

Aspects of the present disclosure may include a number of benefits or advantages, such as improvements in key performance indicators (KPIs). For instance, aspects of the present disclosure may reduce the processing time for downscaling operations. For certain downscaling operations, e.g., a 1024×768 input image resulting in output images of 1024×768 and 640×480, aspects of the present disclosure may reduce the processing time, e.g., a reduction from 8-11 ms to 5-7 ms. Aspects of the present disclosure may also improve the DDR bandwidth consumption in megabytes per-second (MBps). For example, for certain downscaling operations, e.g., a 1024×768 input image resulting in output images of 1024×768 and 640×480, aspects of the present disclosure may improve the DDR bandwidth consumption by a certain amount of MBps, e.g., a 40 MBps improvement. Moreover, the aforementioned downscaling operations can be extended to a number of other GPU operations, e.g., image flip, rotation, etc.

FIGS. 3-7 illustrate examples of the aforementioned methods and processes for downscaling operations. As shown in FIGS. 3-7, aspects of the present disclosure, e.g., GPUs and CPUs herein, can perform a number of different steps or processes for downscaling operations in order to reduce the processing time. For instance, CPUs and GPUs herein may configure information associated with an input image, e.g., first input image 610, based on at least one kernel, where the input image is associated with each of a plurality of threads. The plurality of threads may correspond to a plurality of output images including a first output image, e.g., DSa output image 630, and a second output image, e.g., DSb output image 640.

CPUs and GPUs herein may also determine a first input pixel area, e.g., first input pixel area 612, of an input image, e.g., first input image 610, and a second input pixel area, e.g., second input pixel area 614, of the input image, the first input pixel area including a plurality of first input pixels and the second input pixel area including a plurality of second input pixels, the first input pixel area and the second input pixel area associated with at least one kernel. Moreover, the first input pixel area, e.g., first input pixel area 612, may correspond to at least one first pixel of the plurality of first output pixels, e.g., corresponding to DSa output image 630, and the second input pixel area, e.g., second input pixel area 614, may correspond to at least one first pixel of the plurality of second output pixels, e.g., corresponding to DSb output image 640.

In some aspects, the first input pixel area, e.g., first input pixel area 612, may correspond to a first scale factor, e.g., S1=4, and the second input pixel area may correspond to a second scale factor, e.g., S2=16. The one or more first input pixels may be converted by the first scale factor, e.g., S1=4, and the one or more second pixels may be converted by the second scale factor, e.g., S2=16. Also, the second input pixel area, e.g., second input pixel area 614, may be larger than the first input pixel area, e.g., first input pixel area 612, and at least some of the plurality of second pixels that do not correspond to the first input pixel area may be associated with at least one third pixel area, e.g., third input pixel area 616. The first input pixel area, e.g., first input pixel area 612, may be adjacent to the at least one third input pixel area, e.g., third input pixel area 616, the first input pixel area may correspond to at least one first pixel of the plurality of first output pixels, e.g., corresponding to DSa output image 630, and the at least one third input pixel area may correspond to at least one second pixel of the plurality of first output pixels, e.g., corresponding to DSa output image 630.

CPUs and GPUs herein may also convert at least one of one or more first input pixels of the plurality of first input pixels, e.g., corresponding to first input pixel area 612, or one or more second input pixels of the plurality of second input pixels, e.g., corresponding to second input pixel area 614, at least one of the plurality of first input pixels or the plurality of second input pixels corresponding to a first thread of a plurality of threads associated with the at least one kernel. In some instances, converting at least one of the one or more first input pixels or the one or more second input pixels may comprise downscaling at least one of the one or more first input pixels or the one or more second input pixels. Further, the one or more first input pixels may be converted before the one or more second input pixels are converted and/or the one or more first input pixels may be converted after the one or more second input pixels are converted.

CPUs and GPUs herein may also store, in at least one cache or memory, the converted at least one of the one or more first input pixels, e.g., corresponding to first input pixel area 612, or the one or more second input pixels, e.g., corresponding to second input pixel area 614.

CPUs and GPUs herein may also obtain, based on the stored at least one of the one or more first input pixels or the one or more second input pixels, at least one of the plurality of second input pixels, e.g., corresponding to second input pixel area 614, or at least one the plurality of first input pixels e.g., corresponding to first input pixel area 612. In some aspects, the obtained at least one of the plurality of second input pixels or at least one the plurality of first input pixels may be based on a number of hits of the at least one cache or memory.

CPUs and GPUs herein may also configure, based on the stored at least one of the one or more first input pixels or the one or more second input pixels, at least one of one or more first output pixels of a plurality of first output pixels, e.g., corresponding to DSa output image 630, or one or more second output pixels of a plurality of second output pixels, e.g., corresponding to DSb output image 640, the plurality of first output pixels and the plurality of second output pixels corresponding to the plurality of threads associated with the at least one kernel.

CPUs and GPUs herein may also configure at least one of a first output image, e.g., DSa output image 630, based on the plurality of first output pixels or a second output image, e.g., DSb output image 640, based on the plurality of second output pixels, where the first output image and the second output image are associated with the plurality of threads.

CPUs and GPUs herein may also display at least one of the first output image, e.g., DSa output image 630, or the second output image, e.g., DSb output image 640, where the first output image and/or the second output image may be displayed at a display or a display panel.

Figure 8:
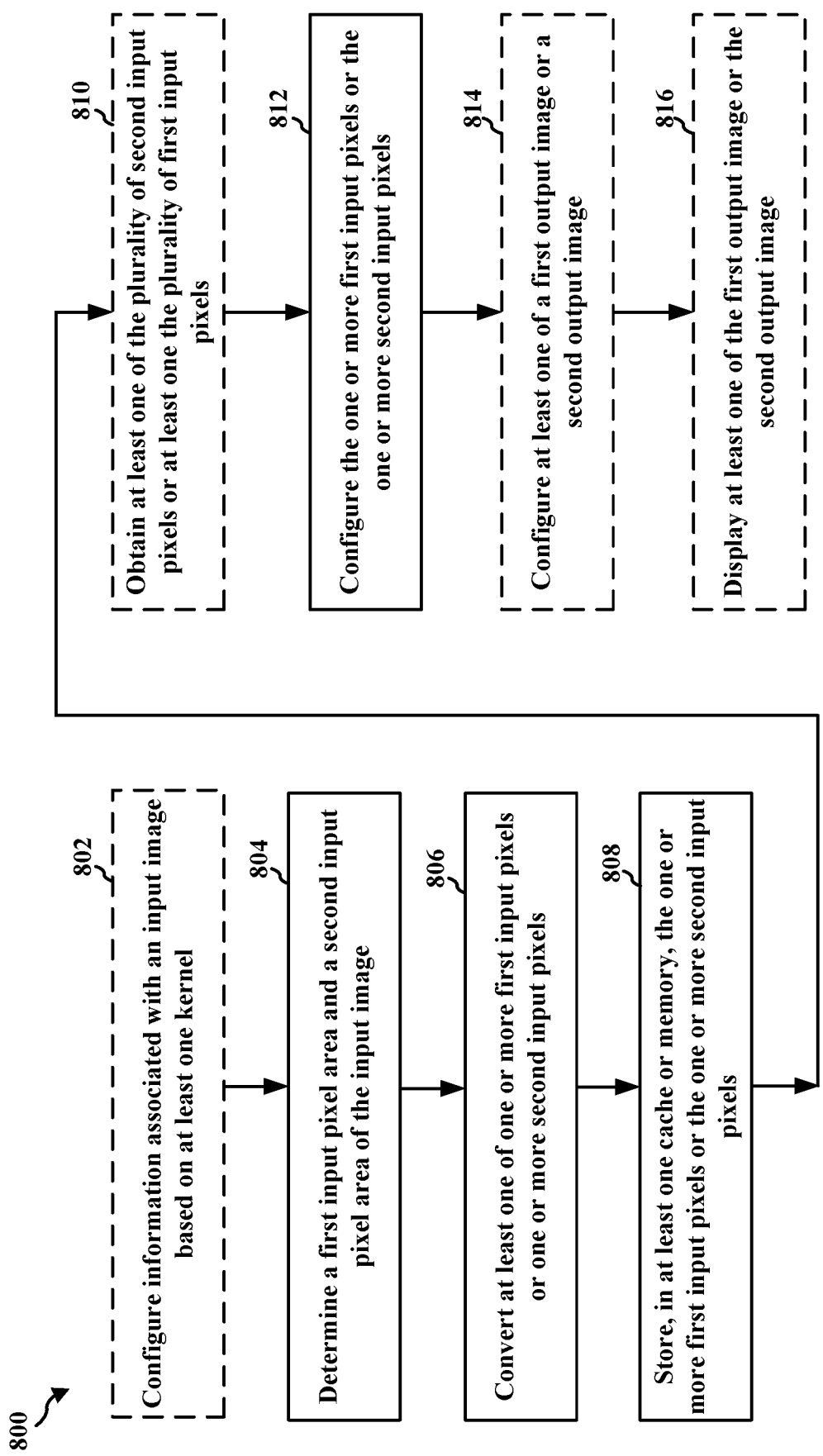
FIG. 8 illustrates an example flowchart of an example method in accordance with one or more techniques of this disclosure.

FIG. 8 illustrates a flowchart 800 of an example method in accordance with one or more techniques of this disclosure. The method may be performed by an apparatus such as a CPU, a GPU, or an apparatus for graphics processing.

At 802, the apparatus may configure information associated with an input image based on at least one kernel, where the input image is associated with each of a plurality of threads, as described in connection with the examples in FIGS. 3-7. The plurality of threads may correspond to a plurality of output images including a first output image and a second output image, as described in connection with the examples in FIGS. 3-7.

At 804, the apparatus may determine a first input pixel area of an input image and a second input pixel area of the input image, the first input pixel area including a plurality of first input pixels and the second input pixel area including a plurality of second input pixels, the first input pixel area and the second input pixel area associated with at least one kernel, as described in connection with the examples in FIGS. 3-7. Moreover, the first input pixel area may correspond to at least one first pixel of the plurality of first output pixels and the second input pixel area may correspond to at least one first pixel of the plurality of second output pixels, as described in connection with the examples in FIGS. 3-7.

In some aspects, the first input pixel area may correspond to a first scale factor and the second input pixel area may correspond to a second scale factor, as described in connection with the examples in FIGS. 3-7. The one or more first input pixels may be converted by the first scale factor and the one or more second pixels may be converted by the second scale factor, as described in connection with the examples in FIGS. 3-7. Also, the second input pixel area may be larger than the first input pixel area, and at least some of the plurality of second pixels that do not correspond to the first input pixel area may be associated with at least one third pixel area, as described in connection with the examples in FIGS. 3-7. The first input pixel area may be adjacent to the at least one third input pixel area, the first input pixel area may correspond to at least one first pixel of the plurality of first output pixels and the at least one third input pixel area may correspond to at least one second pixel of the plurality of first output pixels, as described in connection with the examples in FIGS. 3-7.

At 806, the apparatus may convert at least one of one or more first input pixels of the plurality of first input pixels or one or more second input pixels of the plurality of second input pixels, at least one of the plurality of first input pixels or the plurality of second input pixels corresponding to a first thread of a plurality of threads associated with the at least one kernel, as described in connection with the examples in FIGS. 3-7. In some instances, converting at least one of the one or more first input pixels or the one or more second input pixels may comprise downscaling at least one of the one or more first input pixels or the one or more second input pixels, as described in connection with the examples in FIGS. 3-7. Further, the one or more first input pixels may be converted before the one or more second input pixels are converted and/or the one or more first input pixels may be converted after the one or more second input pixels are converted, as described in connection with the examples in FIGS. 3-7.

At 808, the apparatus may store, in at least one cache or memory, the converted at least one of the one or more first input pixels or the one or more second input pixels, as described in connection with the examples in FIGS. 3-7.

At 810, the apparatus may obtain, based on the stored at least one of the one or more first input pixels or the one or more second input pixels, at least one of the plurality of second input pixels or at least one the plurality of first input pixels, as described in connection with the examples in FIGS. 3-7. In some aspects, the obtained at least one of the plurality of second input pixels or at least one the plurality of first input pixels may be based on a number of hits of the at least one cache or memory, as described in connection with the examples in FIGS. 3-7.

At 812, the apparatus may configure, based on the stored at least one of the one or more first input pixels or the one or more second input pixels, at least one of one or more first output pixels of a plurality of first output pixels or one or more second output pixels of a plurality of second output pixels, the plurality of first output pixels and the plurality of second output pixels corresponding to the plurality of threads associated with the at least one kernel, as described in connection with the examples in FIGS. 3-7.

At 814, the apparatus may configure at least one of a first output image based on the plurality of first output pixels or a second output image based on the plurality of second output pixels, where the first output image and the second output image are associated with the plurality of threads, as described in connection with the examples in FIGS. 3-7.

At 816, the apparatus may display at least one of the first output image or the second output image, as described in connection with the examples in FIGS. 3-7.

In one configuration, a method or apparatus for graphics processing is provided. The apparatus may be a CPU, a GPU, or some other processor that can perform graphic s processing. In one aspect, the apparatus may be the processing unit 120 within the device 104, or may be some other hardware within device 104 or another device. The apparatus may include means for determining a first input pixel area of an input image and a second input pixel area of the input image, the first input pixel area including a plurality of first input pixels and the second input pixel area including a plurality of second input pixels, the first input pixel area and the second input pixel area associated with at least one kernel. The apparatus may also include means for converting at least one of one or more first input pixels of the plurality of first input pixels or one or more second input pixels of the plurality of second input pixels, at least one of the plurality of first input pixels or the plurality of second input pixels corresponding to a first thread of a plurality of threads associated with the at least one kernel. The apparatus may also include means for storing, in at least one cache or memory, the converted at least one of the one or more first input pixels or the one or more second input pixels. The apparatus may also include means for configuring, based on the stored at least one of the one or more first input pixels or the one or more second input pixels, at least one of one or more first output pixels of a plurality of first output pixels or one or more second output pixels of a plurality of second output pixels, the plurality of first output pixels and the plurality of second output pixels corresponding to the plurality of threads associated with the at least one kernel. The apparatus may also include means for configuring at least one of a first output image based on the plurality of first output pixels or a second output image based on the plurality of second output pixels, where the first output image and the second output image are associated with the plurality of threads. The apparatus may also include means for displaying at least one of the first output image or the second output image. The apparatus may also include means for obtaining, based on the stored at least one of the one or more first input pixels or the one or more second input pixels, at least one of the plurality of second input pixels or at least one the plurality of first input pixels. The apparatus may also include means for configuring information associated with the input image based on the at least one kernel, where the input image is associated with each of the plurality of threads.

The subject matter described herein can be implemented to realize one or more benefits or advantages. For instance, the described graphics processing techniques can be used by a CPU, a GPU, or some other processor that can perform graphics processing to implement the downscaling operation techniques described herein. This can also be accomplished at a low cost compared to other graphics processing techniques. Moreover, the graphics processing techniques herein can improve or speed up data processing or execution. Further, the graphics processing techniques herein can improve resource or data utilisation and/or resource efficiency. Additionally, aspects of the present disclosure can utilize downscaling operation techniques in order to improve the processing time and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
   determining a first input pixel area of an input image and a second input pixel area of the input image, the first input pixel area including a plurality of first input pixels and the second input pixel area including a plurality of second input pixels, the first input pixel area and the second input pixel area associated with at least one kernel;
   converting one or more first input pixels of the plurality of first input pixels and one or more second input pixels of the plurality of second input pixels, wherein the one or more first input pixels are converted by a first scale factor and the one or more second input pixels are converted by a second scale factor, the plurality of first input pixels and the plurality of second input pixels corresponding to a first thread of a plurality of threads associated with the at least one kernel, wherein the first thread is associated with multiple conversion operations at a same time, such that at least one of the plurality of first input pixels is read at the same time as at least one of the plurality of second input pixels;

storing, in at least one cache or memory, the one or more first input pixels and the one or more second input pixels;

configuring, based on the one or more first input pixels and the one or more second input pixels, one or more first output pixels of a plurality of first output pixels and one or more second output pixels of a plurality of second output pixels, the plurality of first output pixels and the plurality of second output pixels corresponding to the plurality of threads associated with the at least one kernel; and configuring a first output image based on the plurality of first output pixels and a second output image based on the plurality of second output pixels, wherein the first output image and the second output image are associated with the plurality of threads.

2. The method of claim 1, further comprising:
displaying at least one of the first output image or the second output image.

3. The method of claim 1, further comprising:
obtaining, based on the stored at least one of the one or more first input pixels or the one or more second input pixels, at least one of the plurality of second input pixels or at least one the plurality of first input pixels.

4. The method of claim 3, wherein the obtained at least one of the plurality of second input pixels or at least one the plurality of first input pixels are based on a number of hits of the at least one cache or memory.

5. The method of claim 1, wherein the first input pixel area corresponds to the first scale factor and the second input pixel area corresponds to the second scale factor.

6. The method of claim 1, wherein the second input pixel area is larger than the first input pixel area, and at least some of the plurality of second input pixels that do not correspond to the first input pixel area are associated with at least one third input pixel area.

7. The method of claim 6, wherein the first input pixel area is adjacent to the at least one third input pixel area, the first input pixel area corresponding to at least one first pixel of the plurality of first output pixels and the at least one third input pixel area corresponding to at least one second pixel of the plurality of first output pixels.

8. The method of claim 1, wherein converting at least one of the one or more first input pixels or the one or more second input pixels comprises downscaling at least one of the one or more first input pixels or the one or more second input pixels.

9. The method of claim 1, further comprising:
configuring information associated with the input image based on the at least one kernel, wherein the input image is associated with each of the plurality of threads.

10. The method of claim 9, wherein the plurality of threads corresponds to a plurality of output images including the first output image and the second output image.

11. The method of claim 1, wherein the one or more first input pixels are converted before the one or more second input pixels are converted or the one or more first input pixels are converted after the one or more second input pixels are converted.

12. The method of claim 1, wherein the first input pixel area corresponds to at least one first pixel of the plurality of first output pixels and the second input pixel area corresponds to at least one second pixel of the plurality of second output pixels.

13. An apparatus for graphics processing, comprising:
a first memory; and
at least one processor coupled to the first memory and configured to:
determine a first input pixel area of an input image and a second input pixel area of the input image, the first input pixel area including a plurality of first input pixels and the second input pixel area including a plurality of second input pixels, the first input pixel area and the second input pixel area associated with at least one kernel;
convert one or more first input pixels of the plurality of first input pixels and one or more second input pixels of the plurality of second input pixels, wherein the one or more first input pixels are converted by a first scale factor and the one or more second input pixels are converted by a second scale factor, the plurality of first input pixels and the plurality of second input pixels corresponding to a first thread of a plurality of threads associated with the at least one kernel, wherein the first thread is associated with multiple conversion operations at a same time, such that at least one of the plurality of first input pixels is read at the same time as at least one of the plurality of second input pixels;
store, in at least one cache or memory, the one or more first input pixels and the one or more second input pixels;
configure, based on the one or more first input pixels and the one or more second input pixels, one or more first output pixels of a plurality of first output pixels and one or more second output pixels of a plurality of second output pixels, the plurality of first output pixels and the plurality of second output pixels corresponding to the plurality of threads associated with the at least one kernel; and
configure a first output image based on the plurality of first output pixels and a second output image based on the plurality of second output pixels, wherein the first output image and the second output image are associated with the plurality of threads.

14. The apparatus of claim 13, wherein the at least one processor is further configured to:
display at least one of the first output image or the second output image.

15. The apparatus of claim 13, wherein the at least one processor is further configured to:
obtain, based on the stored at least one of the one or more first input pixels or the one or more second input pixels, at least one of the plurality of second input pixels or at least one the plurality of first input pixels.

16. The apparatus of claim 15, wherein the obtained at least one of the plurality of second input pixels or at least one the plurality of first input pixels are based on a number of hits of the at least one cache or memory.

17. The apparatus of claim 13, wherein the first input pixel area corresponds to the first scale factor and the second input pixel area corresponds to the second scale factor.

18. The apparatus of claim 13, wherein the second input pixel area is larger than the first input pixel area, and at least some of the plurality of second input pixels that do not correspond to the first input pixel area are associated with at least one third input pixel area.

19. The apparatus of claim 18, wherein the first input pixel area is adjacent to the at least one third input pixel area, the first input pixel area corresponding to at least one first pixel of the plurality of first output pixels and the at least one third input pixel area corresponding to at least one second pixel of the plurality of first output pixels.

20. The apparatus of claim 13, wherein converting at least one of the one or more first input pixels or the one or more second input pixels comprises downscaling at least one of the one or more first input pixels or the one or more second input pixels.

21. The apparatus of claim 13, wherein the at least one processor is further configured to:
configure information associated with the input image based on the at least one kernel, wherein the input image is associated with each of the plurality of threads.

22. The apparatus of claim 21, wherein the plurality of threads corresponds to a plurality of output images including the first output image and the second output image.

23. The apparatus of claim 13, wherein the one or more first input pixels are converted before the one or more second input pixels are converted or the one or more first input pixels are converted after the one or more second input pixels are converted.

24. The apparatus of claim 13, wherein the first input pixel area corresponds to at least one first pixel of the plurality of first output pixels and the second input pixel area corresponds to at least one second pixel of the plurality of second output pixels.

25. An apparatus for graphics processing, comprising:
means for determining a first input pixel area of an input image and a second input pixel area of the input image, the first input pixel area including a plurality of first input pixels and the second input pixel area including a plurality of second input pixels, the first input pixel area and the second input pixel area associated with at least one kernel;
means for converting one or more first input pixels of the plurality of first input pixels and one or more second input pixels of the plurality of second input pixels, wherein the one or more first input pixels are converted by a first scale factor and the one or more second input pixels are converted by a second scale factor, the plurality of first input pixels and the plurality of second input pixels corresponding to a first thread of a plurality of threads associated with the at least one kernel, wherein the first thread is associated with multiple conversion operations at a same time, such that at least one of the plurality of first input pixels is read at the same time as at least one of the plurality of second input pixels;
means for storing, in at least one cache or memory, the one or more first input pixels and the one or more second input pixels;
means for configuring, based on the one or more first input pixels and the one or more second input pixels, one or more first output pixels of a plurality of first output pixels and one or more second output pixels of a plurality of second output pixels, the plurality of first output pixels and the plurality of second output pixels corresponding to the plurality of threads associated with the at least one kernel; and
means for configuring a first output image based on the plurality of first output pixels and a second output image based on the plurality of second output pixels, wherein the first output image and the second output image are associated with the plurality of threads.

26. The apparatus of claim 25, further comprising:
means for displaying at least one of the first output image or the second output image.

27. The apparatus of claim 25, further comprising:
means for obtaining, based on the stored at least one of the one or more first input pixels or the one or more second input pixels, at least one of the plurality of second input pixels or at least one the plurality of first input pixels.

28. The apparatus of claim 27, wherein the obtained at least one of the plurality of second input pixels or at least one the plurality of first input pixels are based on a number of hits of the at least one cache or memory.

29. The apparatus of claim 25, wherein the first input pixel area corresponds to the first scale factor and the second input pixel area corresponds to the second scale factor.

30. The apparatus of claim 25, wherein the second input pixel area is larger than the first input pixel area, and at least some of the plurality of second input pixels that do not correspond to the first input pixel area are associated with at least one third input pixel area.

31. The apparatus of claim 30, wherein the first input pixel area is adjacent to the at least one third input pixel area, the first input pixel area corresponding to at least one first pixel of the plurality of first output pixels and the at least one third input pixel area corresponding to at least one second pixel of the plurality of first output pixels.

32. The apparatus of claim 25, wherein converting at least one of the one or more first input pixels or the one or more second input pixels comprises downscaling at least one of the one or more first input pixels or the one or more second input pixels.

33. The apparatus of claim 25, further comprising:
means for configuring information associated with the input image based on the at least one kernel, wherein the input image is associated with each of the plurality of threads.

34. The apparatus of claim 33, wherein the plurality of threads corresponds to a plurality of output images including the first output image and the second output image.

35. The apparatus of claim 25, wherein the one or more first input pixels are converted before the one or more second input pixels are converted or the one or more first input pixels are converted after the one or more second input pixels are converted.

36. The apparatus of claim 25, wherein the first input pixel area corresponds to at least one first pixel of the plurality of first output pixels and the second input pixel area corresponds to at least one second pixel of the plurality of second output pixels.

37. A non-transitory computer-readable medium storing computer executable code for graphics processing, the code when executed by a processor causes the processor to:
determine a first input pixel area of an input image and a second input pixel area of the input image, the first input pixel area including a plurality of first input pixels and the second input pixel area including a plurality of second input pixels, the first input pixel area and the second input pixel area associated with at least one kernel;

convert one or more first input pixels of the plurality of first input pixels and one or more second input pixels of the plurality of second input pixels, wherein the one or more first input pixels are converted by a first scale factor and the one or more second input pixels are converted by a second scale factor, the plurality of first input pixels and the plurality of second input pixels corresponding to a first thread of a plurality of threads associated with the at least one kernel, wherein the first thread is associated with multiple conversion operations at a same time, such that at least one of the plurality of first input pixels is read at the same time as at least one of the plurality of second input pixels;

store, in at least one cache or memory, the one or more first input pixels and the one or more second input pixels;

configure, based on the one or more first input pixels and the one or more second input pixels, one or more first output pixels of a plurality of first output pixels and one or more second output pixels of a plurality of second output pixels, the plurality of first output pixels and the plurality of second output pixels corresponding to the plurality of threads associated with the at least one kernel; and configure a first output image based on the plurality of first output pixels and a second output image based on the plurality of second output pixels, wherein the first output image and the second output image are associated with the plurality of threads.

* * * * *